United States Patent [19]
Brill

[11] 3,709,417
[45] Jan. 9, 1973

[54] PICTURE PROJECTOR
[75] Inventor: Henry L. Brill, Flushing, N.Y.
[73] Assignee: E. R. E. Laboratory, Inc., West Orange, N.J.
[22] Filed: June 1, 1971
[21] Appl. No.: 148,403

[52] U.S. Cl. .................226/76, 226/145, 226/157, 352/188
[51] Int. Cl. ...............................................G03b 1/24
[58] Field of Search...............226/76, 157, 144, 145; 352/187, 188

[56] References Cited

UNITED STATES PATENTS

| | | | |
|---|---|---|---|
| 2,040,856 | 5/1936 | Krum | 226/157 X |
| 3,075,680 | 1/1963 | Bolinder | 226/157 |

Primary Examiner—Richard A. Schacher
Attorney—George H. Fritzinger

[57] ABSTRACT

A motion picture projector for use especially in teaching machines in continuous engagement with the film, which is stepped ahead selectively in different projector modes — i. e., motion picture, slow motion, still picture, single frame-to-frame and is driven continuously at fast speed in different scan modes. The step movement of the sprocket wheel is produced by a high speed cam-actuated pawl and ratchet mechanism through a one revolution spring clutch, and scanning movement is produced by a separate drive motor in continuous coupling engagement with the sprocket wheel. By special design great indexing accuracy and quiet operation are achieved.

14 Claims, 9 Drawing Figures

INVENTOR.
HENRY L. BRILL
BY
George H. Fritzinger

PATENTED JAN 9 1973

INVENTOR.
HENRY L. BRILL

BY George H. Fritzinger

AGENT

INVENTOR.
HENRY L. BRILL

BY George H. Fritzinger

AGENT

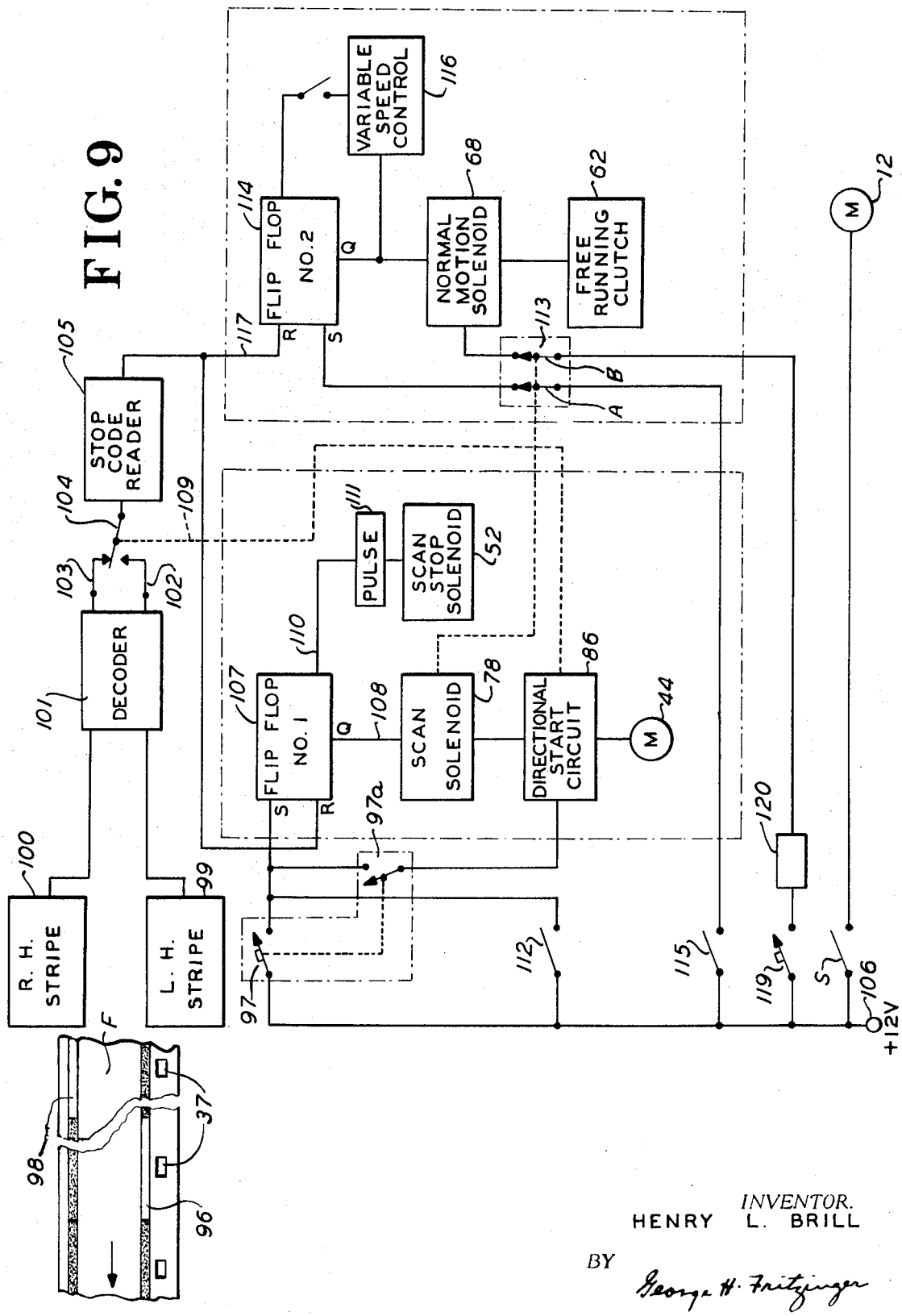

PICTURE PROJECTOR

It is an object of the invention to provide a simplified drive mechanism for a motion picture projector wherein a stepping movement of the film and a continuous scanning movement thereof are both accomplished through a sprocket wheel in continuous engagement with the film.

Another object is to drive the sprocket wheel with a step movement in all projector modes by a cam operated pawl and associated ratchet wheel wherein the rocker lever for the pawl comes into positive interlocking engagement with the ratchet wheel at the end of each step advance and the ratchet wheel is restrained by a damping drum to achieve accurate indexing.

Another object is to reduce the masses of the moving parts of the ratchet mechanism to a minimum and to activate the rocker lever at its center of percussion to reduce vibration and noise during all projector modes.

Another object is to provide an improved pawl and ratchet mechanism that will enable each step advance of the film to be achieved at such high speed that the motion of the film is imperceptible and the need for a shutter is eliminated.

A further object is to provide such projector with a reversible scan motor in permanent coupling with the sprocket wheel.

A still further object is to provide a solenoid operated shift mechanism which converts the drive mechanism instantaneously from projector modes to scanning modes.

These and other objects of the invention will be apparent from the following description and the appended claims.

In the description of my invention reference is had to the accompanying drawings, of which:

FIG. 9 is a simplified block diagram of the drive circuitry for the projector.

Figure 2:
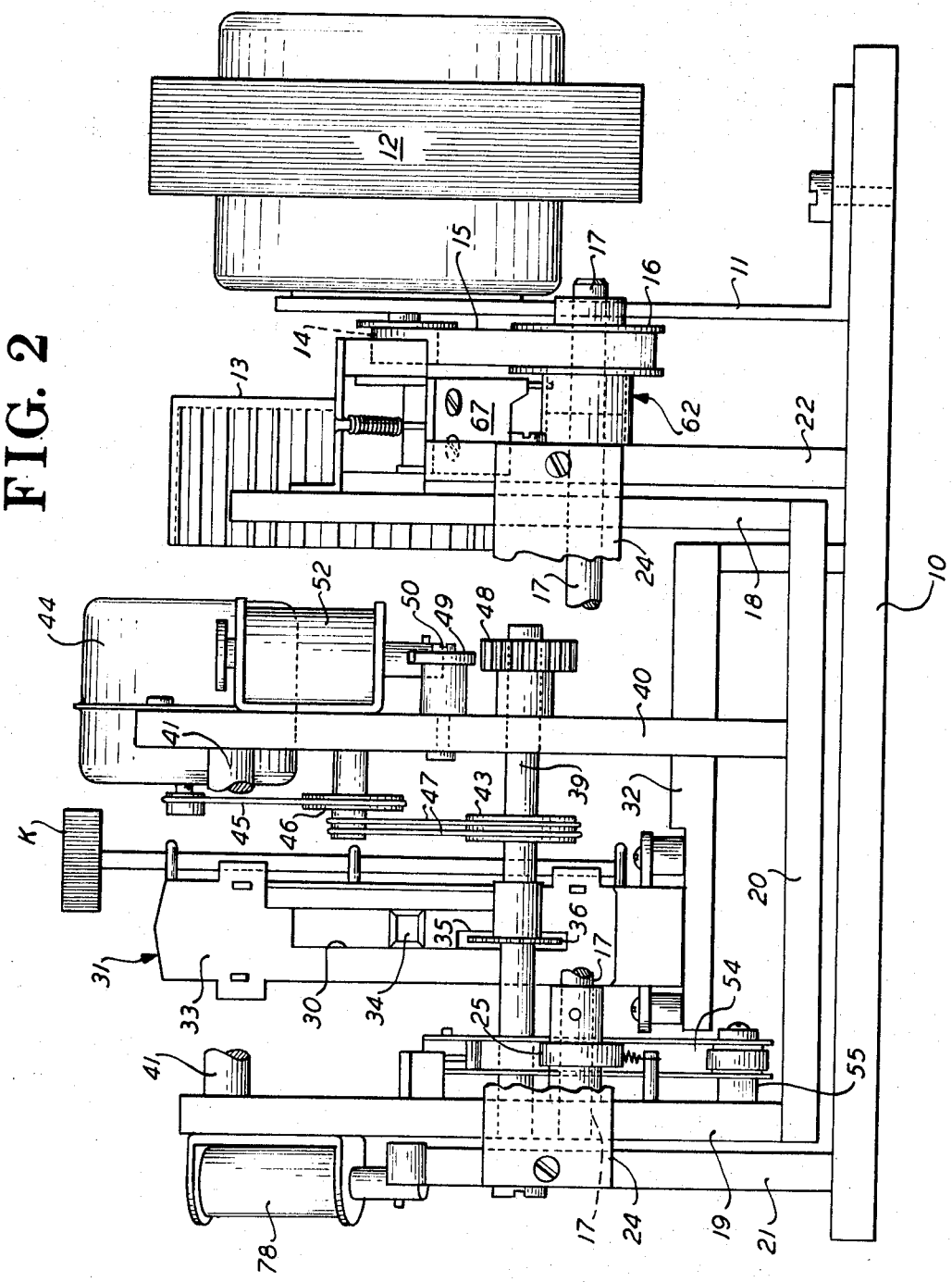
FIG. 2 is a front elevational view of the projector.
Figure 3:
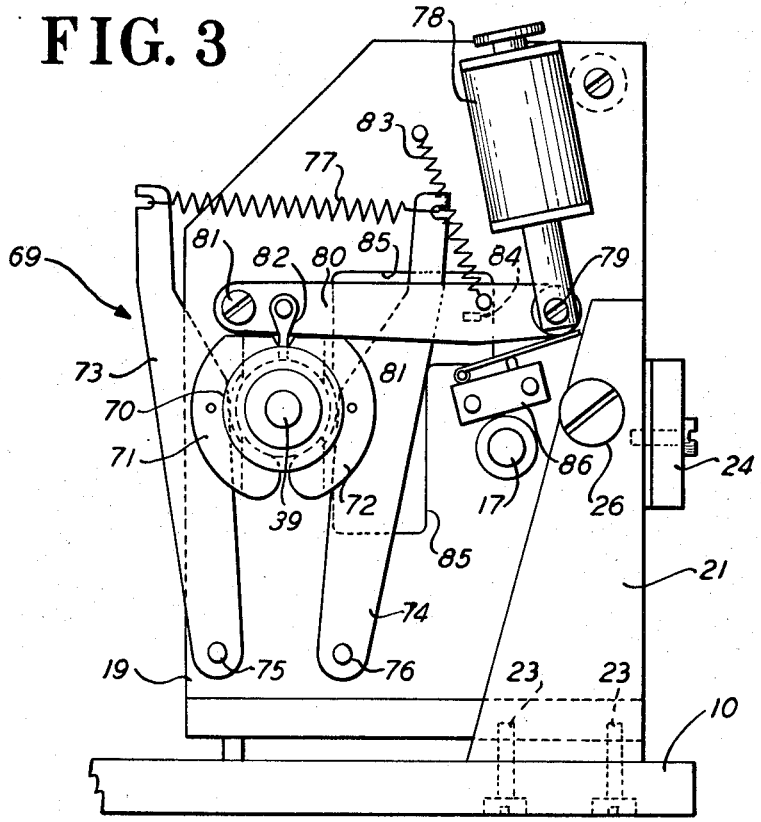
FIG. 3 is a left-hand elevational view.
Figure 5:
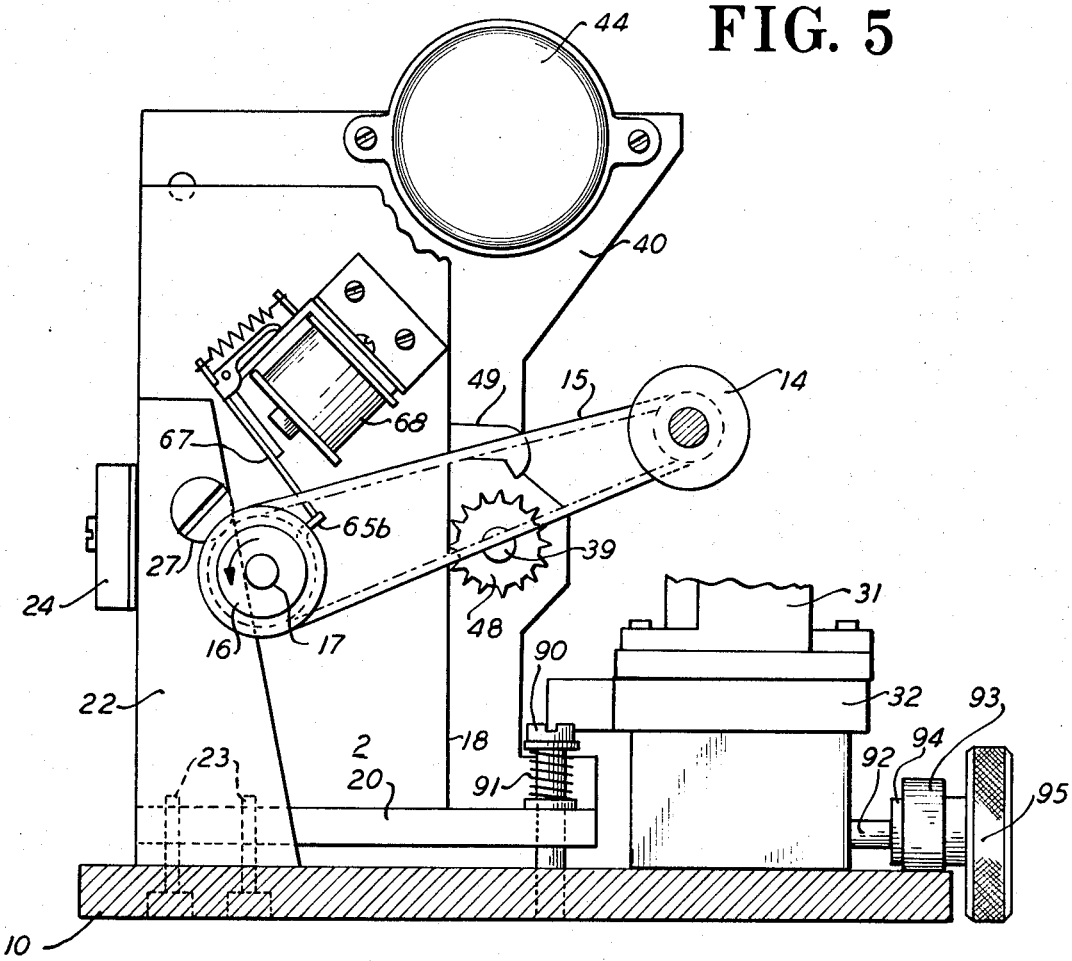
FIG. 5 is a section on the line 5—5 of FIG. 1.

The projector mechanism has a frame comprising a base plate 10 to the right end portion of which is bolted an L-bracket 11 supporting a drive motor 12. On the shaft of the motor there is a drum type cooling fan 13 and a pulley 14. The pulley is coupled by a belt 15 to a pulley 16 on a cam shaft 17. This shaft extends from right to left along the front of the projector and is journaled in a standard 18 near its right end and in a standard 19 at its left end both upstanding from a separate intermediate base 20. (FIG. 2). The standards 18 and 19 and the separate base 20 form an adjustable frame for the projector mechanism hereinafter further described. At the left and right sides of the adjustable frame are standards 21 and 22 secured by screws 23 to the main base 10 (FIGS. 3 and 5). These standards are interconnected by a tie bar 24 intermediate the height of the standards. Pivot studs 26 and 27 traverse the fixed standards 21 and 22 and thread into the side standards 19 and 18 of the adjustable frame for pivotally supporting the latter at the front of the projector. A cam block 87 is provided for tilting the frame 18-20 about these studs to adjust the framing of the film as is herein later more fully described.

In the rearward left half portion of the projector there is a film cartridge 28 preferably of an endless film type such as is described in the pending Walker application Ser. No. 86,076, filed Nov. 2, 1970. This cartridge has a flat forward wall 29 provided with a wide rectangular opening 30. The cartridge is mounted from the rear of the projector in a standard type holder 31 which is mounted on a platform 32 (FIG. 5) secured rigidly to the main base 10. The holder has an upright front wall 33 (FIGS. 1 and 2) provided with a lens aperture 34 and a slot 35 for enabling a sprocket wheel 36 to engage the sprocket holes 37 in a short length of the film. A lamp 38 mounted also on the platform 32 is positioned to direct light obliquely into the hollow portion of the cartridge whereat it is reflected by a mirror (not shown) through the lens aperture 34. The mirror is shiftable into and out of the holder as after the cartridge is mounted and before the same is removed by turning a control knob K shown in FIG. 2.

Figure 1:
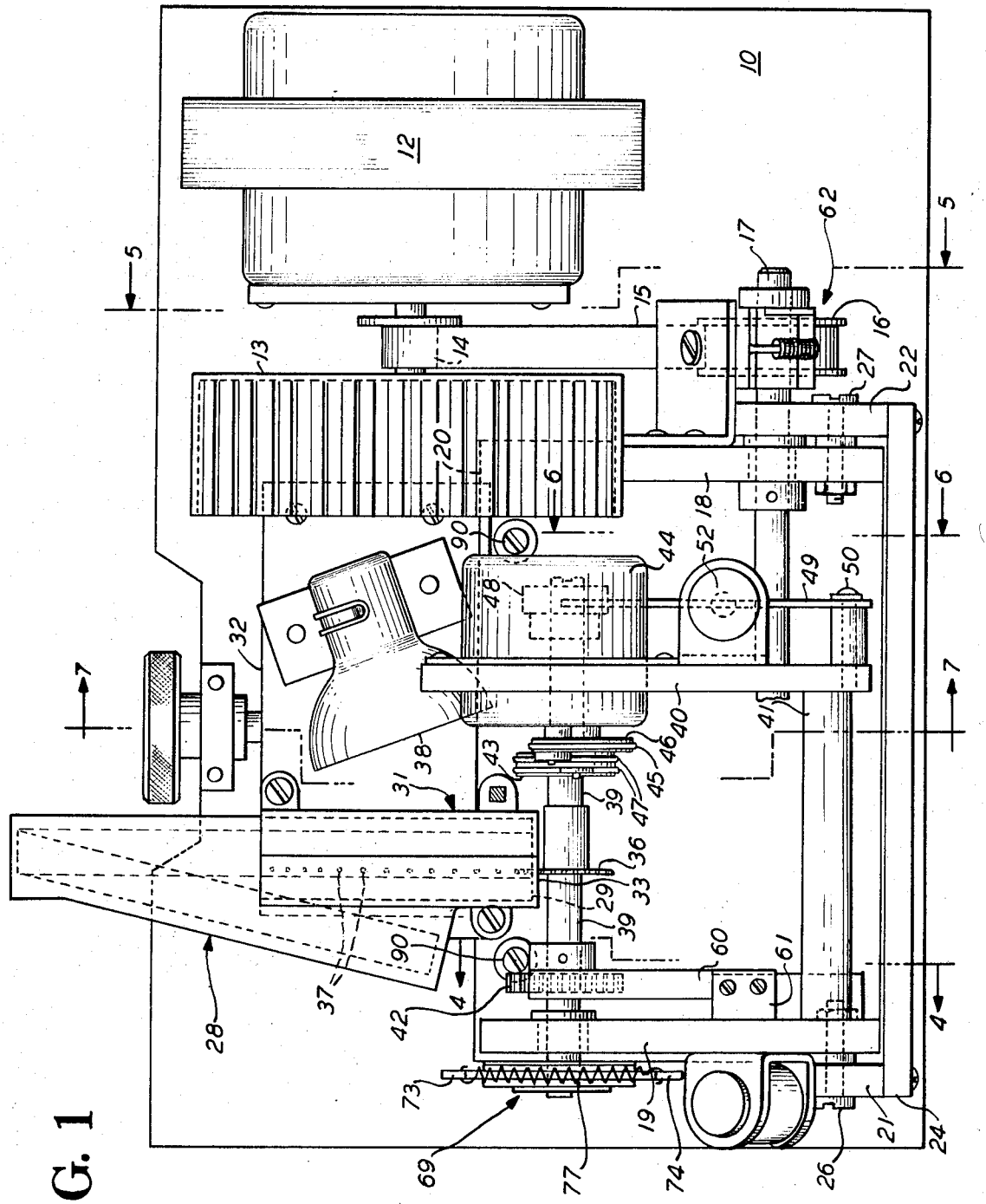
FIG. 1 is a top plan view of a motion picture projector incorporating my invention.
Figure 6:
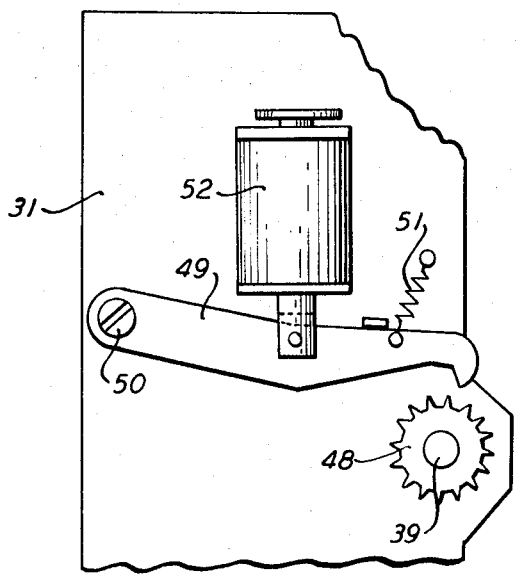
FIG. 6 is a section on the line 6—6 of FIG. 1.
Figure 7:
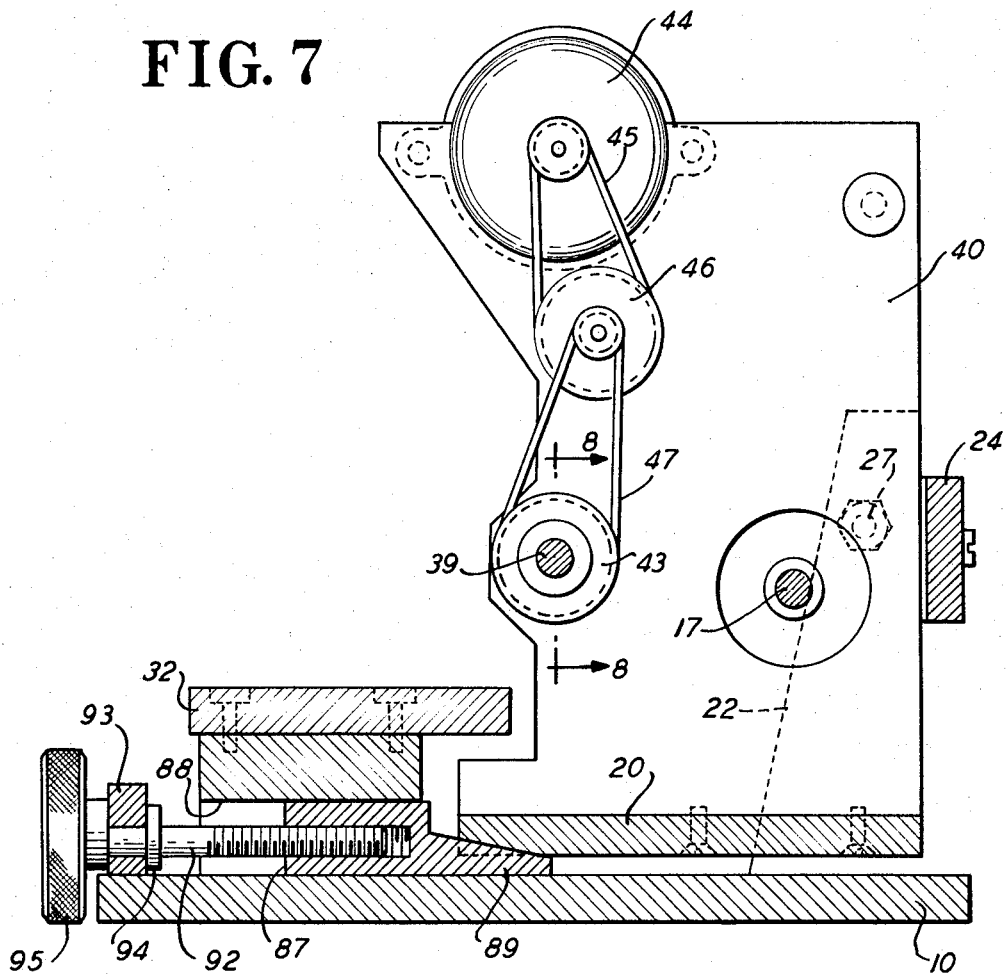
FIG. 7 is a section on the line 7—7 of FIG. 1.

The sprocket wheel 36 is mounted on a shaft 39 journaled at its left end in the standard 19 and at its right end in an intermediate standard 40 upstanding from the adjustable base 20, the two standards being interconnected by a tie bar 41 shown in FIG. 1. Secured to the left end portion of the shaft 39 near the standard 19 is a ratchet wheel 42 and secured to the shaft to the right of the sprocket wheel 36 is a pulley 43. A scan motor 44 is mounted on the intermediate standard 40 and is coupled via a belt 45, step-down pulley 46 and belts 47 to the pulley 43 to provide a permanent coupling of the scan motor to the sprocket wheel. Further, secured to the shaft 39 at the right of the intermediate standard 40 is a star wheel 48 engageable by a stop pawl 49 shown in FIGS. 1, 5 and 6. This pawl is pivoted at 50 to the standard 40 and is biased into disengaged position by a tension spring 51. By activation of a solenoid 52 the pawl is pushed into engagement with the star wheel to brake the drive of the shaft 39 and stop the film at an exact point wherein a frame of the film is at the lens aperture 34.

Figure 4:
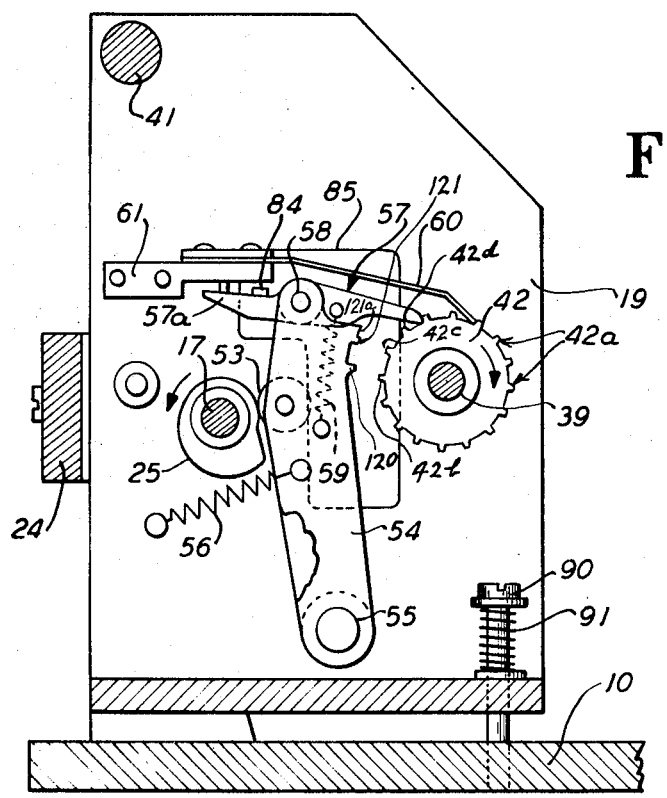
FIG. 4 is a section on the line 4—4 of FIG. 2.

A cam 25 on the left end portion of the shaft 17 operates against a roller 53 journaled on a nearly vertical rocker lever 54 pivoted at its lower end on a stud 55 secured to the standard 19 and biased via spring 56 towards the cam (FIGS. 2 and 4). The rocker lever 54 is disposed between the cam 25 and the ratchet wheel 42, and has a nearly horizontal pawl 57 pivoted at 58 to its upper end portion. The pawl 57 engages the upper or crest portion of the ratchet wheel 42 relative to the pivot 55 of the rocker lever under pressure of a tension spring 59 connected between the pawl 57 and lever 54. Above the rocker lever 54 there is a one-way latch spring 60 mounted at one end on a bracket 61 secured to the standard 19. This latch spring is biased to engage the ratchet wheel 42. At the end of each forward stroke of the rocker lever 54 the latch pawl snaps over a tooth 42a of the ratchet wheel to latch the ratchet wheel against reverse movement during the return stroke of the rocker lever.

Each advance of the rocker lever 54 and each step advance of the ratchet wheel 42 is limited by an interlocking engagement of a pair of teeth 120 and 121 on the rocker lever 54 respectively with a tooth 42b and a pair of teeth 42c and 42d of the ratchet wheel. The tooth 120 has a width about one-half the inter-tooth space on the ratchet wheel and is positioned to engage the leading face of the tooth 42b approximately on a diameter line of the ratchet wheel in tangency with the line of travel of the tooth 120. The tooth 121 engages the next inter-tooth space 42c–42d and has a width sufficient to engage that space without play. In order that the rocker lever may engage the ratchet wheel progressively during the latter position of each advance stroke the leading half of the tooth 121 is stepped back at 121a by half the depth of each inter-tooth space on the ratchet wheel.

Figure 8:
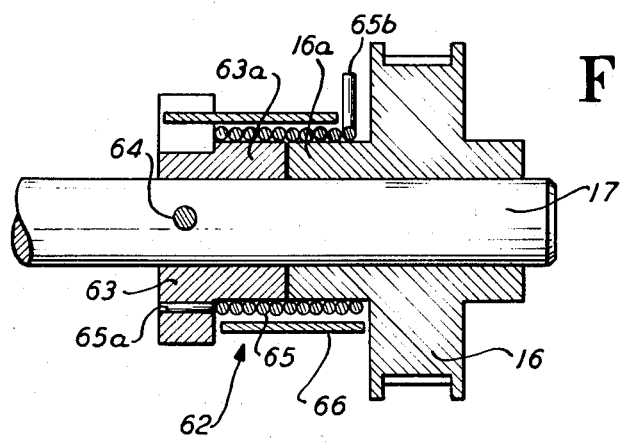
FIG. 8 is a section on the line 8—8 of FIG. 7.

The cam shaft 17 is driven from the pulley 16 through a one-revolution spring band clutch 62 shown in detail in FIG. 8. The pulley 16 is freely journaled on the shaft 17 against a collar 63 pinned at 64 to the shaft. The collar and pulley have hubs 16a and 63a abutting end to end and of equal diameters. On these hubs there is a coil spring 65 surrounded by an outer sleeve 66 to prevent any deformation of the spring. The coil spring has a tail 65a at one end anchored in the collar and has a radial tang 65b at the other end. An armature 67 of an electromagnet 68 is normally in a latching position against the tang 65b as shown in FIG. 5 to allow the pulley to be driven in a counterclockwise direction with slippage in the coil spring. However, the instant the electromagnet is emergized to unlatch the tang 67, the coil spring grips the hub 16a by the resilience of the spring and additionally by the friction of the hub against the spring to lock the pulley to the collar 63. When the electromagnet is deenergized the armature 67 is returned to latch the tang 65b at the end of the revolution then underway and stop the shaft 17. If the electromagnet is continued to be energized it will allow the motor 12 to continue to drive the cam shaft. Each revolution of the cam shaft causes the pawl 57 to advance the ratchet wheel 42 by a one-tooth distance and the film by one frame. When the electromagnet 68 is deenergized it always stops the cam shaft 17 in the same position — which is a position wherein the rocker lever 54 is in a fully retracted position shown in FIG. 4.

In the present projector the cam shaft 17 is driven at a high speed such that each revolution takes place within about 50 milliseconds. Further, a steep lobe is provided on the cam rising to its height within about 30°, therefore causing the ratchet wheel to be advanced by one step within about 5 milliseconds. For example, if the sprocket wheel 36 has the same number of teeth as the ratchet wheel and each tooth represents a frame on the film, then each frame is advanced into the lens aperture within the 5 millisecond pull down rate of the film. This pull down speed is the same regardless of whether the film is advanced by a single frame or is stepped in sequence by a number of frames. In all cases the speed of pull down is so high as to render the motion of the film from one frame to the other almost imperceptible and to make unnecessary the user of the usual shutter.

The instant a frame reaches the lens aperture the latching spring 60 engages the next tooth 42a of the ratchet wheel to lock the sprocket wheel against receding movement. The lobe of the cam is about 90° long causing the pawl to dwell in its advance position for about 15 milliseconds. During the rest of the continuing revolution of the cam the pawl 57 is retracted to a position back of the next tooth as shown in FIG. 4.

In order to prevent inertia overthrow of the sprocket wheel 36 during its fast step advance by the cam 25, the sprocket wheel shaft 39 is placed under a friction load by a damping mechanism 69 (FIGS. 1 and 3) comprising a drum 70 secured to the shaft 39 to the left of the standard 19 and a pair of diametrically opposite brake shoes 71 and 72 mounted respectively on levers 73 and 74 pivoted at 75 and 76 to the standard 19 and biased towards each other by an interconnecting tension spring 77 to draw the brake shoes against the drum.

Mounted on the upper part of the standard 19 is a scan solenoid 78 of a pusher type. The armature of this solenoid is pivoted at 79 to a horizontal lever 80 which overlies the brake shoes 71 and 72 and is pivoted at 81 to the standard 19. Pivoted to the lever 80 is a depending wedge 82 which engages between the two brake shoes to pry the shoes apart from the drum 70 when the solenoid 78 is activated against the action of a return spring 83. Also, as the lever 80 is so pushed downwardly by the solenoid, a side lug 84 thereon, which extends through a window 85 in the standard 19, is moved against a rear arm 57a of the pawl 57 first to disengage the pawl from the ratchet wheel 42 and next to swing the pawl against the latch spring 60 to disengage it also from the ratchet wheel, thus freeing the ratchet wheel for movement in either direction. At the end of the forward stroke of the solenoid 78 it activates a directional start circuit 86 for the scan motor 44.

The film F is provided with a stop code 96 at the left side of the picture frames (FIG. 9) which is a home code to which the film is advanced whenever a home switch 97 is depressed. Further, the film is provided with stop codes 98 on the right side of the picture frames to represent the start positions of respective items of information such as of chapters. The codes 96–98 are detected by respective photocells 99 and 100 which feed into a decoder 101. This decoder has two output circuits 102 and 103 which are connectable selectively by a switch 104 into a stop code reader 105 to read respectively the left and right codes on the film.

At the start of operation of the projector a main on-off switch S is closed to connect a 12 volt voltage source 106 to the main drive motor 12. As before described, this motor drives the cooling system for the projector and provides the power for advancing the film step-by-step by the ratchet mechanism.

When the home switch 97 is closed a first pole thereof connects a 12 volt voltage source 106 to the S input of a flip-flop circuit 107 and at the same time a second pole 97a thereof connects the voltage source 106 to the directional start circuit 86. The flip-flop circuit 107 is toggled to activate the scan solenoid 78 via a lead 108 and the latter activates the directional start circuit 86 — which is normally in reverse position — into its forward position to start the scan motor 44 in a forward direction. When the start circuit 86 is activated into a forward direction it shifts the code selector switch 104 to the circuit 102 via an intercoupling indicated by the tie line 109 to place the detector system in condition to read only the home code 96 on the left side of the film.

When the home code is reached the stop code reader 105 resets the flip-flop circuit 107 causing the scan solenoid 78 to be deactivated and momentarily causing activation of the scan stop solenoid 52 via a circuit 110 and pulsing timer 111 for a 50 millisecond interval. The resetting of the scan solenoid 78 cuts power off from the scan motor 44, restores the brake 69 and reengages the pawls 57 and 60 with the ratchet wheel 42; concurrently, the pulse operation of the stop solenoid 52 engages the pawl 49 momentarily with the star wheel 48 to bring the sprocket wheel 36 to an immediate stop.

When a visual repeat switch 112 is depressed it starts the scan system the same as described above but in a reverse direction because power is not now sent to the directional start circuit 86 leaving it in its normal reverse position. The code selector switch 104 is therefore left in contact with code output circuit 103 to leave the detector system in condition to detect only the stop codes 98 on the right side of the film. The scan motor therefore runs in a reverse direction until a stop code 98 is reached, at which time the scan solenoid 78 is deactivated, the stop scan solenoid 52 is momentarily activated and the film is stopped at the stop code position. Since the flip-flop circuit 107 activates alternately the scan solenoid 78 and the stop solenoid 52 any possible simultaneous operation of these two solenoids which could cause mechanical interference is avoided.

Whenever the machine is not in scan condition a switch 113 controlled by the scan solenoid 78 is closed at pole A to cause 12 volts to be connected to the S input of a flip-flop circuit 114 when a manual "normal-motion" switch 115 is depressed. The flip-flop circuit 114 is thereby toggled and activates the solenoid 68 to engage the free running clutch 62 and cause the film to be stepped ahead by the ratchet mechanism at a rate of about 18 frames per second — i.e., the speed of rotation of the shaft 17. Since the scan mechanism is not now operated the detecting system is connected to read the stop codes at the right side of the film. When the stop code reader 105 receives a signal from a stop code 98 it feeds a signal via a circuit 117 into the R terminal of the flip-flop circuit 114 to reset the flip-flop circuit 114 and cause the solenoid 68 to drop out and stop the step advance of the film.

A speed control 116 connected to the flip-flop circuit 114 is operable to release the clutch 62 within 50 milliseconds to stop the drive after each frame advance and to reactivate the clutch within a variable time limit determined by the setting of the control so that a variable time spacing is provided between successive step movements of the film. In this way the projection rate can be varied from 22 frames per second down to a slow rate of one frame every second or two.

When it is desired to advance the film by a single frame a manual switch 119 is depressed to connect the voltage source 106 through a pulse timing circuit 120 direct to the solenoid 68 but this connection is made through the switch 113 pole B controlled by the scan solenoid 78 so that the ratchet mechanism cannot be operated to step the film ahead when the scan system is in operation. The momentary activation of the solenoid 68 releases the clutch 62 but for a lesser time than the 50 millisecond one-revolution period of the clutch to limit the advance to a single frame.

Since the film is driven in both its projector modes and scan modes by the sprocket wheel 36, the sprocket wheel is left engaged with the film continuously as long as the film cartridge is in its holder, thus avoiding possible damage to the film if the usual intermittently engageable stepping claw were used or if a claw and sprocket wheel were used alternately. Further, the use of a sprocket wheel for all modes permits a simpler design of the projector mechanism.

Features of the present film drive mechanism which enable a great indexing accuracy and quiet operation to be achieved with the use of a high speed ratchet mechanism reside in (1) driving the cam rocker lever 54 by means operating at the center of percussion of the rocker lever, (2) in engaging the ratchet wheel positively with an interlocking tooth on the rocker lever 54 at the end of each advantage step, which engagement limits the advance of the ratchet wheel to a one-tooth distance and also acts as a stop against inertia overthrow of the rocker lever limiting the advance of the pawl to a definite length, and (3) in providing a damping drum on the ratchet wheel shaft to reduce transmission of shocks to the sprocket wheel and to hold the sprocket wheel steady during that part of each cycle when the locking tooth is not engaged. Further, to reduce vibration and noise, the masses of the pawl 57 and rocker lever 54 are kept at a minimum to which end the rocker lever is made of two thin side levers staked together in spaced parallel relation.

The aforementioned adjustability of the intermediate frame 18–20 for the purpose of shifting the loop portion of the film engaged by the sprocket wheel 36 for framing the film in relation to the lens aperture 34 comprises the cam block 87 slidably mounted on the main base 10 in a guideway 88 provided in the platform 32. The cam block has a wedge-shaped finger 89 at its forward end underlying the rearward portion of the base 20. Two bolts 90 traverse the base 20 at its left and right rearward corners (FIG. 1) and thread into the main base 10, and between the heads of these bolts and the base 20 are compression springs 91 (FIG. 4) which hold the base 20 firmly against the wedge-shaped finger 89. An adjusting screw 92 threads into the cam block 87 from its rearward end and extends through a standard 93 secured to the base 10. A collar 94 on the screw at the front side of the stud 93 and a knob 95 secured to the screw at the back of the stud serve to hold the screw from longitudinal displacement with the result that when the knob 95 is turned the cam block is shifted forwardly or rearwardly to vary the tilting of the frame 18–20 about the studs 26 and 27 and thus to shift the film relative to the lens aperture by reason of its engagement with the sprocket wheel 36 carried by the frame 18–20.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. A picture projector including a picture film having successive frames and sprocket holes along the film, a sprocket wheel engaging said film, and means for intermittently advancing said film by steps comprising a ratchet wheel coupled to said sprocket wheel, a rocker lever pivoted on an axis spaced from the axis of said ratchet wheel for movement of a near-end portion towards and away from said ratchet wheel substantially along a diameter line of the ratchet wheel, a drive pawl pivoted to said near-end portion of said rocker lever for engaging an outer end portion of said ratchet wheel relative to the pivot axis of the rocker lever to advance said ratchet wheel as the rocker lever is moved towards the ratchet wheel, and a tooth on said rocker lever for engaging an inter-tooth space of the ratchet wheel on a diameter line thereof to stop said rocker lever and limit each step advance of the ratchet wheel to the distance between successive teeth.

2. The picture projector set forth in claim 1 wherein said tooth is located on said rocker lever to engage the leading face of a tooth of said ratchet wheel when said pawl has advanced said ratchet wheel by a one-tooth distance.

3. The picture projector set forth in claim 2, including a second tooth on said rocker lever engageable with the next inter-tooth space on the ratchet wheel ahead of that engaged by said first mentioned tooth as said ratchet wheel is advanced by a one-tooth distance by said pawl, said second tooth being dimensioned to engage said inter-tooth space of the ratchet wheel without play.

4. The picture projector set forth in claim 3 wherein said first mentioned tooth is dimensioned to engage a trailing predetermined portion of an inter-tooth space of said ratchet wheel, and wherein said second tooth is stepped along its leading half portion whereby to permit said first mentioned tooth and said second tooth to engage progressively the respective inter-tooth spaces of said ratchet wheel as the ratchet wheel is advanced through the latter portion of each one-tooth distance.

5. A picture projector including a picture film having successive frames and sprocket holes along the film, a sprocket wheel engaging said film, and means for intermittently advancing said film by steps comprising a ratchet wheel coupled to said sprocket wheel, a rocker lever pivoted for movement of a portion thereof towards and away from said ratchet wheel, a drive pawl pivoted to said rocker lever for engaging said ratchet wheel to advance the latter by a one tooth distance as the rocker lever is moved towards the ratchet wheel, a rotatably mounted cam for advancing said rocker lever during a portion of each revolution of the cam and a damping drum coupled to said ratchet wheel for imposing a friction load on the ratchet wheel to prevent inertia overthrow of the ratchet wheel as it is stepped ahead by said pawl.

6. The picture projector set forth in claim 5 including spring means connected to said pawl for biasing it into engagement with said ratchet wheel, spring means biasing said rocker lever towards said cam, means for stopping said cam in a retracted position of said rocker lever, and means operable against said drive pawl to hold the pawl disengaged from said ratchet wheel to permit unrestricted scanning movement of said sprocket wheel in either direction.

7. The picture projector set forth in claim 6 including a one-way latch spring engaging said ratchet wheel to permit only step advance by said drive pawl, and means for disengaging said latch spring as said drive pawl is disengaged.

8. The picture projector set forth in claim 7 including a reversible scan motor coupled to said sprocket wheel for driving the sprocket wheel in either direction, and a solenoid activatable for releasing said damping drum, disengaging said drive pawl and latch spring and for starting said reversible scan motor.

9. The picture projector set forth in claim 8 wherein said scan motor is continuously coupled to said ratchet wheel.

10. The projector set forth in claim 9 including a star wheel coupled to said ratchet wheel, a latch pawl engageable with said star wheel to stop scanning movement of said sprocket wheel in either direction, and means operative as an incident to a momentary engagement of said latch pawl with said star wheel to return said latch spring and drive pawl into engagement with said ratchet wheel.

11. A picture projector including a picture film having successive frames and respective sprocket holes, a sprocket wheel continuously engaging said film, and means for moving said film by said sprocket wheel in both projection and scan modes including a drive pawl and ratchet mechanism for advancing said sprocket wheel by steps and a scan motor coupled to said sprocket wheel for driving said sprocket wheel continuously in either direction, a rotatable cam for reciprocating said pawl and a drive motor and one-revolution clutch coupling said drive motor to said cam, and mode control means activatable for shifting said drive pawl out of operative engagement with said ratchet wheel, starting said scan motor and disabling said one revolution clutch.

12. The picture projector set forth in claim 11 including a star wheel secured to the shaft of said sprocket wheel having as many teeth as said sprocket wheel, a stop pawl engageable selectively with said star wheel to stop said film at any selected positioning of the film relative to said lens aperture, a solenoid for engaging said stop pawl with said star wheel, and means rendered operative as said scan motor is started for disabling said solenoid.

13. The picture projector set forth in claim 12 including means effective upon deactivating said mode control means for (1) cutting off the power supply to said scan motor, (2) engaging momentarily said stop pawl with said star wheel to stop said sprocket wheel, and (3) reengaging said drive pawl with said ratchet wheel, restoring said brake drum and reabling said one-revolution clutch and said solenoids.

14. In a motion picture projector including a picture film having successive frames and sprocket holes along the film and an aperture window through which the successive frames are projected: the combination of a sprocket wheel engaging said film, a ratchet wheel coupled to said sprocket wheel, a rocker lever pivoted for movement towards and away from said ratchet wheel, a drive pawl pivoted to said rocker lever for engaging said ratchet wheel to advance the sprocket wheel by a one tooth distance and said film by one frame during each reciprocation of said rocker lever, a rotatably mounted cam for producing one reciprocation of said rocker lever during each revolution of movement of the cam, and means for selectively rotating said cam by integral numbers of revolutions including a rotation drive shaft, a one-revolution integrating clutch coupling said shaft to said cam, said clutch including a latch member and a single cooperating catch element for normally holding the clutch disengaged and for engaging the clutch responsive to a release of said latch member and for disengaging the clutch within the revolution of the shaft then underway when said latch member is returned, and means responsive to a code signal on said film when a predetermined frame on the film reaches said aperture window for returning said latch member to stop said film with said frame at said window.

* * * * *